(12) United States Patent
Chen (10) Patent No.: US 6,473,295 B2
(45) Date of Patent: Oct. 29, 2002

(54) COMPUTER ENCLOSURE (75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 91 days.

(21) Appl. No.: 09/755,685

(22) Filed: Jan. 5, 2001

(65) Prior Publication Data

US 2002/0089818 A1 Jul. 11, 2002

(51) Int. Cl.⁷ .............................. H05K 7/00; A47B 81/00
(52) U.S. Cl. .................... 361/683; 361/725; 312/223.2; 312/265.5
(58) Field of Search ................................. 361/679, 683, 361/724–727, 753, 796, 797, 801; 312/263, 264, 265.1, 265.6, 223.2

(56) References Cited

U.S. PATENT DOCUMENTS

| 5,164,886 A | * | 11/1992 | Chang | 312/257.1 |
| 5,397,176 A | * | 3/1995 | Allen et al. | 312/223.2 |
| 5,593,219 A | * | 1/1997 | Ho | 220/4.02 |
| 5,944,398 A | * | 8/1999 | Wu | 312/223.2 |
| 5,995,364 A | * | 11/1999 | McAnally et al. | 361/685 |
| 6,313,983 B1 | * | 11/2001 | Liu et al. | 248/551 |
| 6,341,072 B1 | * | 1/2002 | Liao | 312/223.2 |
| 6,354,680 B1 | * | 3/2002 | Lin et al. | 292/87 |

* cited by examiner

Primary Examiner—Jayprakash N. Gandhi
(74) Attorney, Agent, or Firm—Wei Te Chung (57) ABSTRACT A computer enclosure includes a chassis (20), a rear panel (50), a loading board (80), first and second drive brackets (110, 150), a power supply bracket (130) and a cover (170). The chassis includes a bottom panel (22) and a front panel (24). Various latching components such as interengaging holes and hooks are formed on the enclosure. The rear panel is secured to the bottom panel of the chassis opposite the front panel. The loading board is secured between the front and rear panels. The first drive bracket is also secured between the front and rear panels, over the loading board. The power supply bracket is secured to the rear panel. The second drive bracket is secured to the first drive bracket and the front panel. The cover, the bottom panel, and the front panels cooperatively surround the loading board, the first and second drive brackets and the power supply bracket.

11 Claims, 8 Drawing Sheets

COMPUTER ENCLOSURE

BACKGROUND OF THE INVENTION

1. Field of the Invention

The present invention relates to a computer enclosure, and more particularly to a computer enclosure which is conveniently assembled together.

2. Related Art

Contemporary electronic devices are being made smaller and lighter. Conventional computer enclosures are assembled together with screws. A plurality of screw holes is required to be defined in various components of the enclosure, to receive the screws. The screws secure the components to each other firmly.

Unfortunately, forming the screw holes in the manufacturing industry is troublesome and time-consuming. Tools are required during attachment or detachment of the components of the enclosures. All this makes industrial production procedures unduly complicated. Screws add yet another part to a manufacturing inventory. Carefully monitoring of inventories is required in order to prevent shutdown of an industrial production line. Any shutdown results in higher costs.

A computer enclosure which overcomes the above-mentioned problems of the related art is strongly desired.

SUMMARY OF THE INVENTION

Accordingly, an object of the present invention is to provide a computer enclosure which is conveniently assembled together.

To achieve the above-mentioned object, a computer enclosure of the present invention comprises a chassis, a rear panel, a loading board, first and second drive brackets, a power supply bracket and a cover. The chassis comprises a bottom panel and a front panel. The front panel forms a plurality of first and second latches. The rear panel is secured to the bottom panel of the chassis opposite the front panel. The rear panel defines an opening at a side thereof and comprises a pair of symmetrical sills respectively formed adjacent top and bottom extremities of the opening. A plurality of hooks is formed at opposite sides of a top portion of the rear panel. Each sill defines a nick and a gap therein. The loading board comprises a pair of flaps. Each flap defines a plurality of orifices for receiving the second latches of the front panel, so that the loading board is secured to the chassis. The first drive bracket comprises a first bottom wall and a pair of first side walls. A pair of wings extends from opposite ends of each first side wall. Each wing defines a plurality of grooves therein, for engaging with the first latches of the front panel and the hooks of the rear panel. The power supply bracket comprises a shield, and a pair of connecting portions respectively extending from top and bottom sides of the shield. The connecting portions are symmetrical. Each connecting portion comprises a lug received in and sliding within the corresponding nick, and a boss received in the corresponding gap. The power supply bracket is received in the opening of the rear panel. The second drive bracket is secured to the front panel and the first drive bracket. The cover of the computer enclosure comprises a top panel, a pair of side panels. The cover, the rear panel and the chassis cooperatively surround the loading board, the power supply bracket, and the first and second drive brackets.

Other objects, advantages and novel features of the present invention will be drawn from the following detailed embodiment of the present invention with attached drawings, in which:

DETAILED DESCRIPTION OF THE PREFERRED EMBODIMENT

Figure 1:
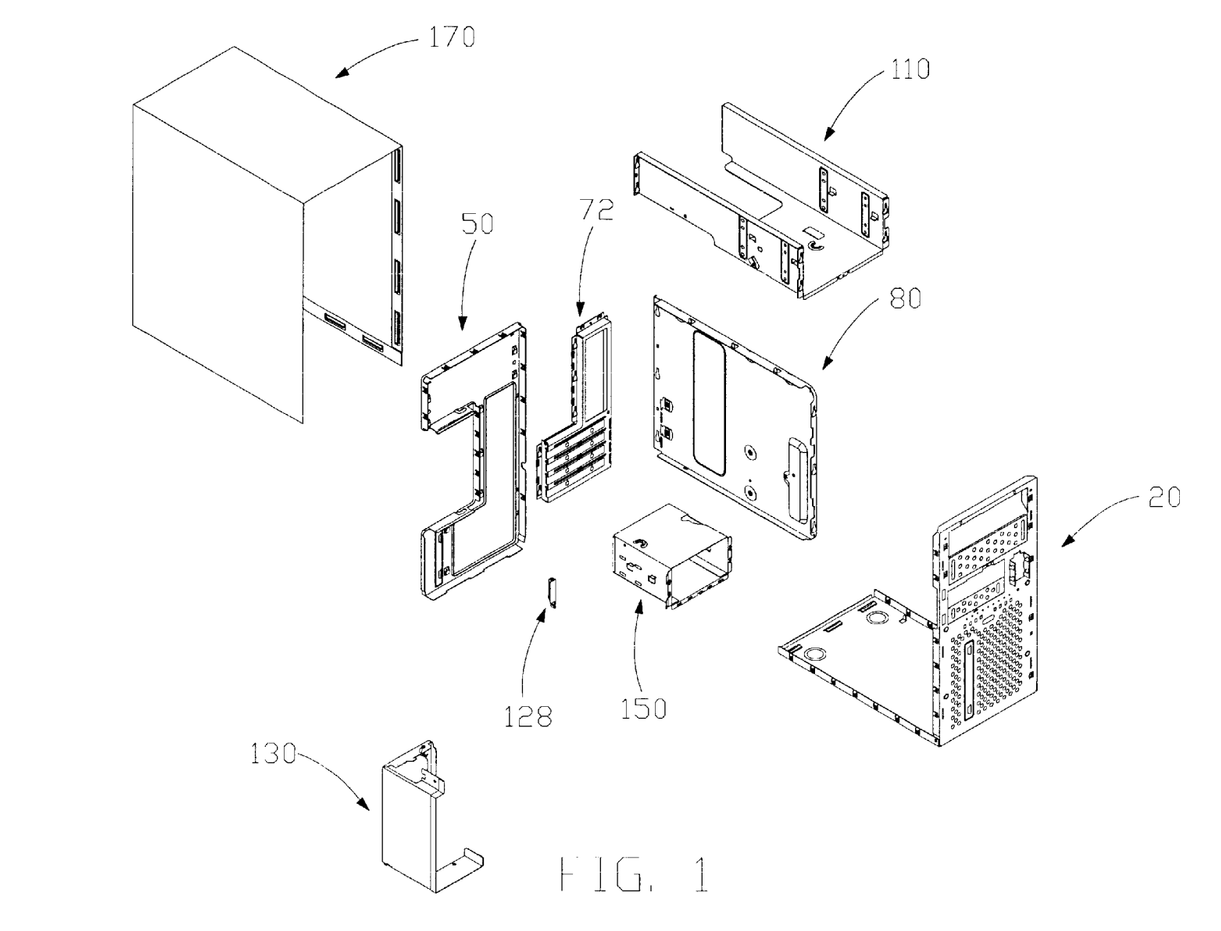
FIG. 1 is an exploded view of a computer enclosure in accordance with the present invention.

Referring to FIG. 1, a computer enclosure in accordance with the present invention comprises a chassis 20, a rear panel 50, a loading board 80, first and second drive brackets 110, 150, a power supply bracket 130 and a cover 170. A rear window frame 72 is attached to the rear panel 50. The second drive bracket 150 is secured to the first drive bracket 110 by a fastener 128.

Figure 2:
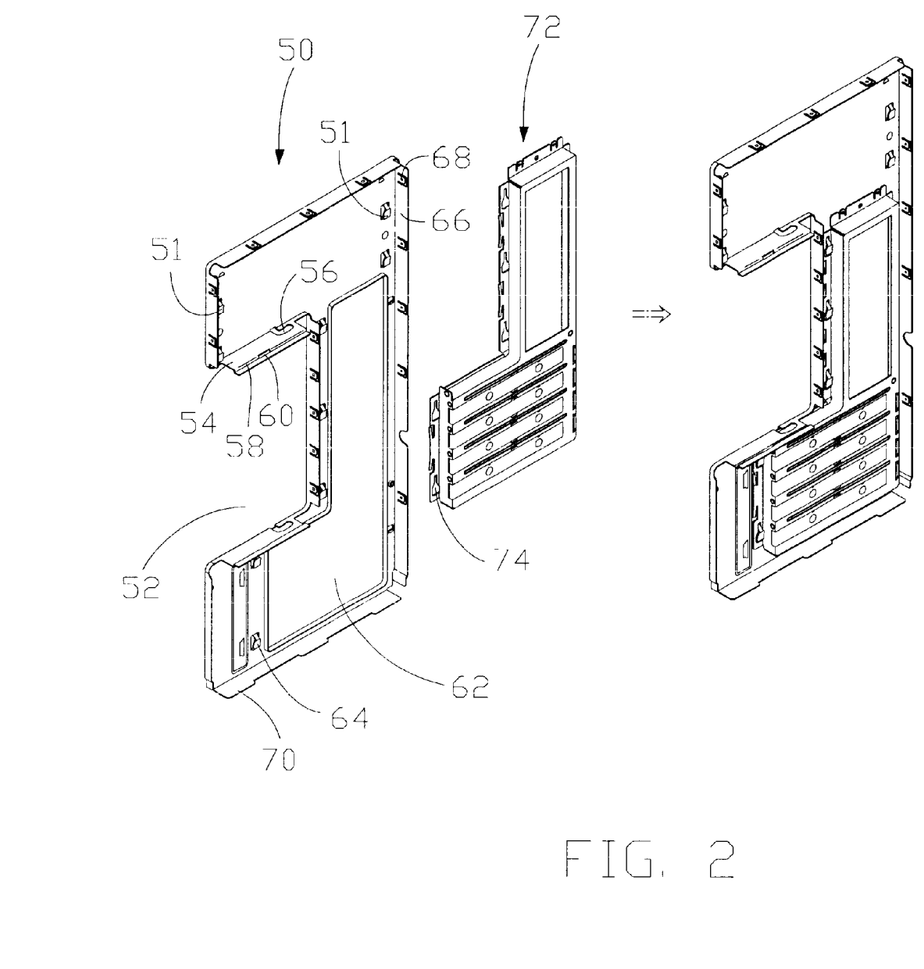
FIGS. 2–8 are perspective views of various procedures of assembly of the enclosure of FIG. 1, in sequential order.

Referring particularly to FIG. 2, the rear panel 50 of the present invention forms a plurality of first hooks 51 at opposite sides of a top portion thereof. A first opening 52 is defined at an edge of a central portion of the rear panel 50. A pair of first sills 54 extends perpendicularly inwardly from the rear panel 50, respectively adjacent top and bottom extremities of the first opening 52. An L-shaped nick 56 is defined in an end of each of the first sills 54. A pair of second sills 58 respectively extends inwardly and slightly toward each other from inner edges of the first sills 54. A gap 60 is defined in each second sill 58. An L-shaped second opening 62 is defined in the rear panel 50 generally adjacent the first opening 52. A plurality of second hooks 64 is defined at a side of the second opening 62, adjacent the first opening 52. A flange 66 extends perpendicularly inwardly from top, bottom and side edges of the rear panel 50. A plurality of protrusions 70 extends coplanarly from a bottom portion of the flange 66. A plurality of spring tabs 68 is formed on the flange 66, for resiliently pressing against the cover 170 of the computer enclosure. An L-shaped rear window frame 72 is attachable to the second opening 62 of the rear panel 50, for receiving expansion cards (not shown) therein. A plurality of locating holes 74 is defined in a side of the rear window frame 72, corresponding to the second hooks 64 of the rear panel 50.

Figure 3:
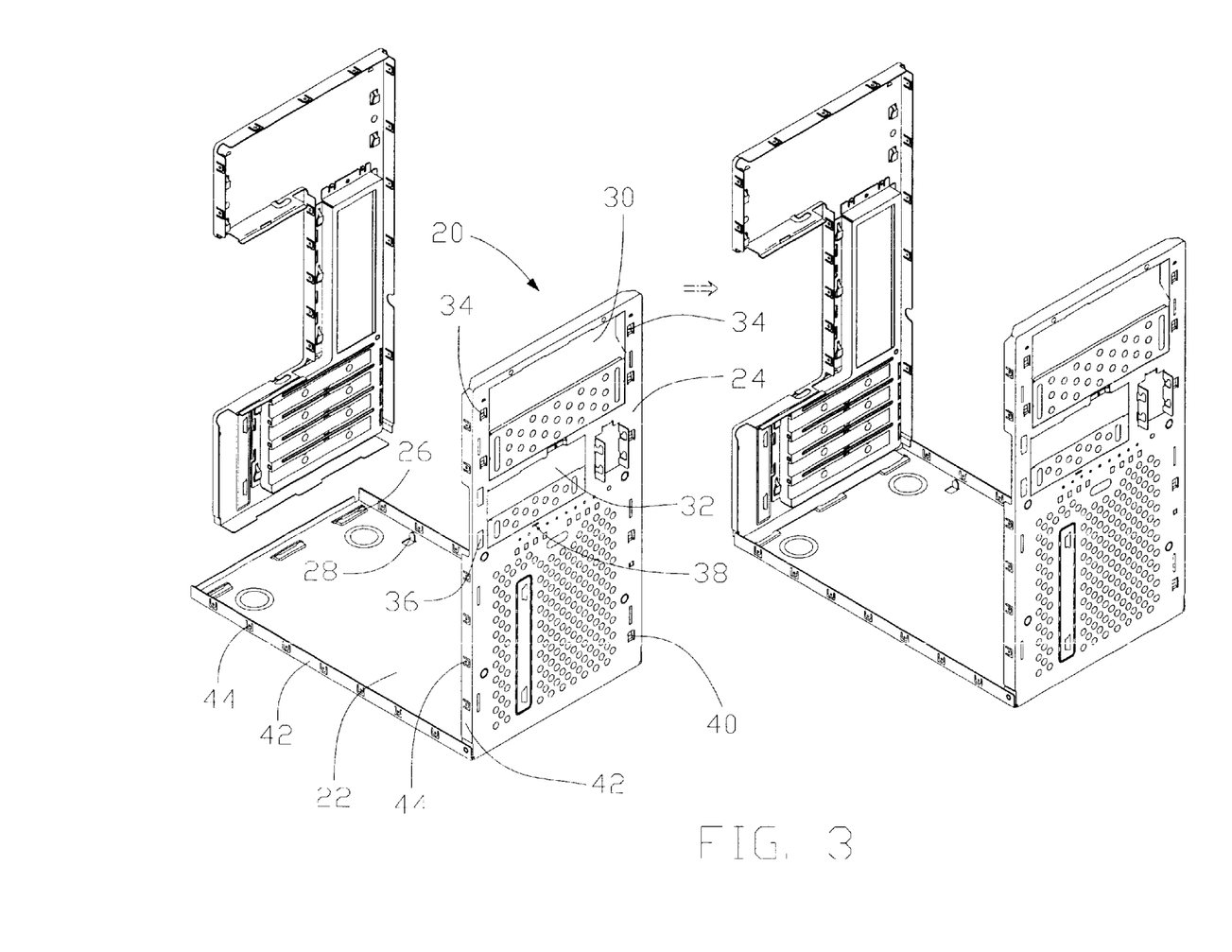

Referring also to FIG. 3, the chassis 20 of the present invention comprises a bottom panel 22 and a front panel 24 extending vertically from an edge of the bottom panel 22. A plurality of embedding holes 26 is defined in the bottom panel 22, opposite to the front panel 24. The embedding holes 26 correspond to the protrusions 70 of the rear panel 50. A locating tab 28 is formed at a side of the bottom panel 22, between the front panel 24 and the embedding holes 26. A first slot 30 is defined in a top portion of the front panel 24, to provide access to a data drive device. A second slot 32 is defined below the first slot 30, to provide access to a data drive device. An aperture 38 is defined below the second slot 32. A plurality of first and second latches 34, 40 is formed at sides of the front panel 24. A pair of slits 36 is defined below the first latches 34, near the second slot 32. A strip 42 extends perpendicularly inwardly from each side edge of the front panel 24, and from each side edge of the bottom panel 22. A plurality of spring fingers 44 is formed on the strips 42, for resiliently pressing against the cover 170 of the computer enclosure.

Figure 4:
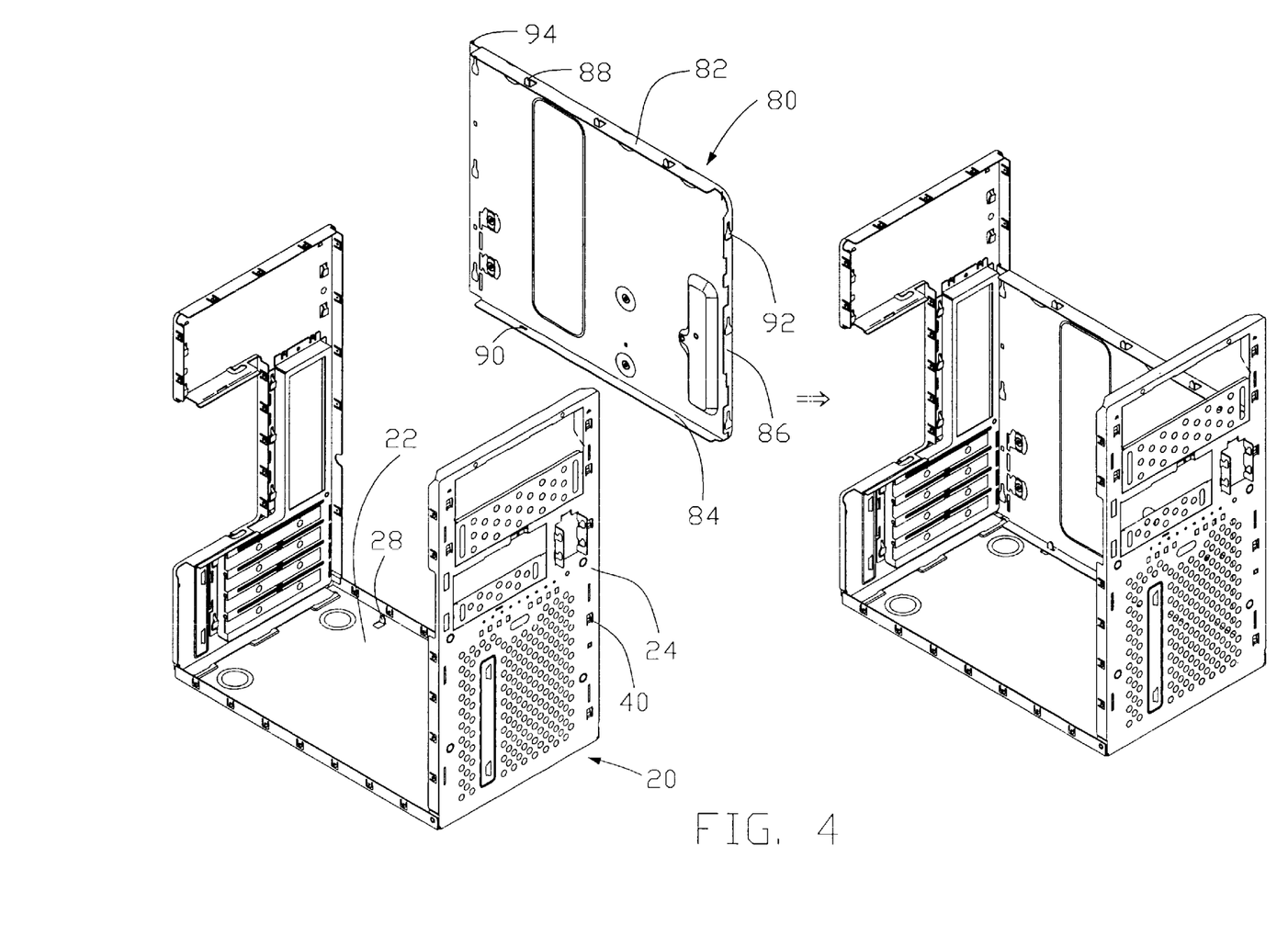

Referring to FIG. 4, the loading board 80 of the present invention is formed from a single metal plate, for securing a motherboard (not shown) thereto. A pair of first flaps 82, 84 respectively extends perpendicularly inwardly from top and bottom edges of the loading board 80. A plurality of locating nubs 88 is formed on the first flap 82. A split 90 is defined in the first flap 84, corresponding to the locating tab 28 of the chassis 20. A pair of second flaps 86, 94 extends perpendicularly from side edges of the loading board 80, in opposite directions. The second flap 86 is directly between directly opposite ends of the first flaps 82, 84. The second flap 86 defines a plurality of orifices 92 therein, corresponding to the second latches 40 of the front panel 24.

Figure 5:
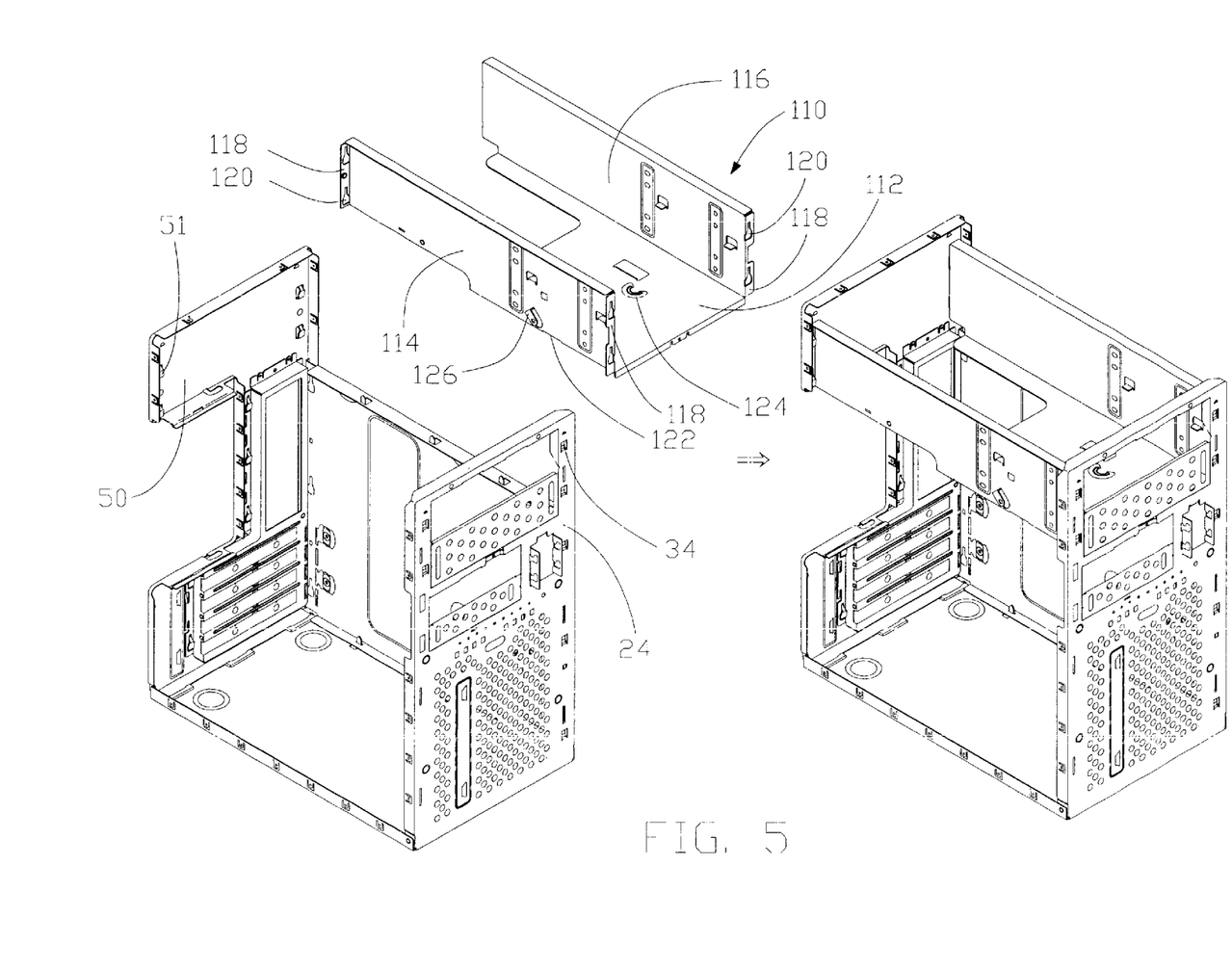

Referring also to FIG. 5, the first drive bracket 110 of the present invention comprises a first bottom wall 112 and first side walls 114, 116. The first side walls 114, 116 extend vertically upwardly from respective opposite lateral edges of the first bottom wall 112. A first retaining cutout 122 is defined through both the first bottom wall 112 and the first side wall 114. The first bottom wall 112 is stamped downwardly in a center portion thereof to form a first retaining portion 124. An external L-shaped pivot portion 126 is formed in the first side wall 114 near the first retaining cutout 122. Each end of each of the first side walls 114, 116 is bent perpendicularly outwardly to form a wing 118. A plurality of grooves 120 is defined in the wings 118, respectively corresponding to the first hooks 51 of the rear panel 50 and the first latches 34 of the chassis 20.

Figure 6:
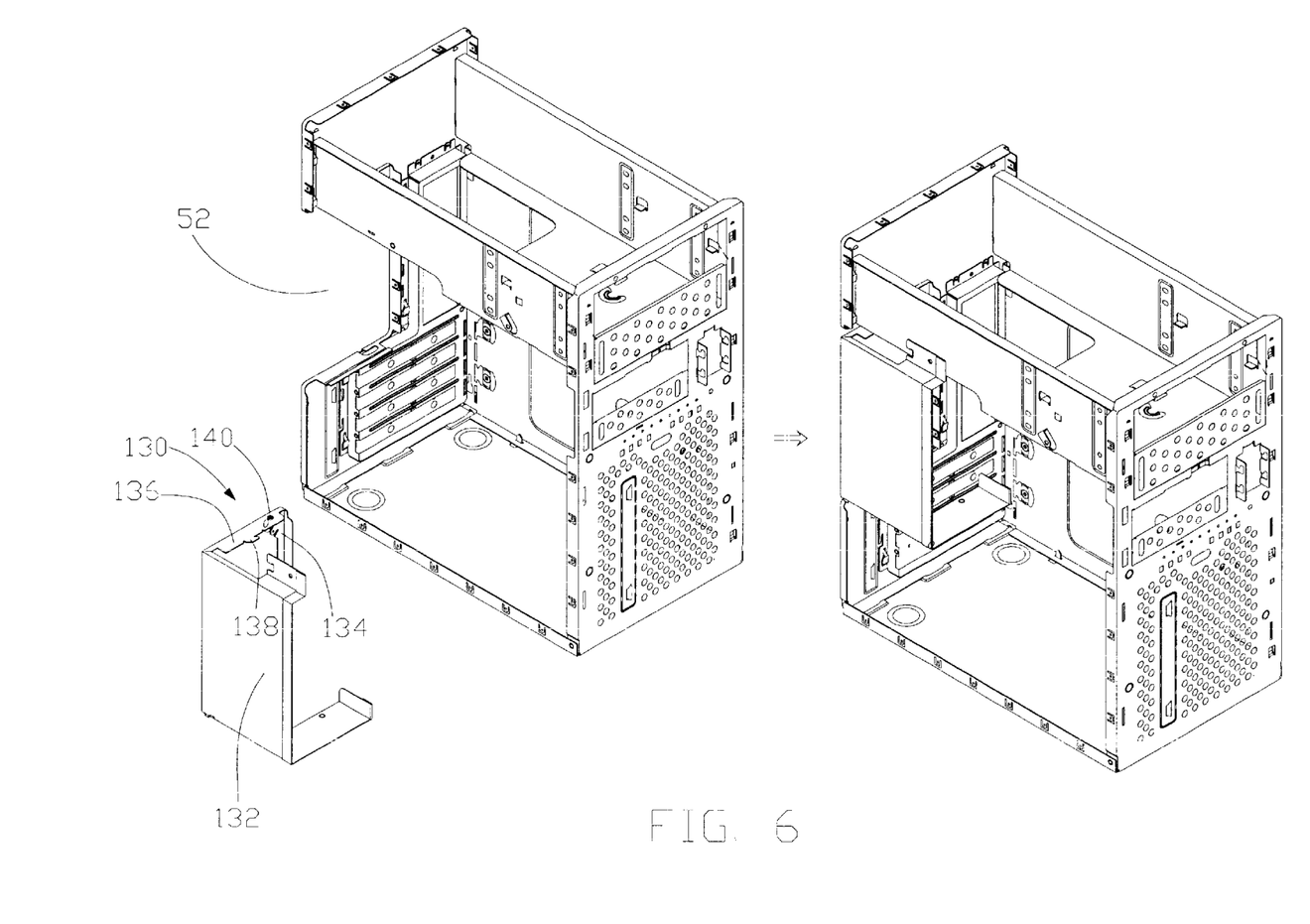

Referring to FIG. 6, the power supply bracket 130 of the present invention is secured to the first opening 52 of the rear panel 50. The power supply bracket 130 comprises a vertical base 132 and a shield 134 extending perpendicularly from a side edge of the base 132. A connecting portion 136 extends inwardly from a top edge of the shield 134. A boss 138 extends inwardly from an outer edge of a central portion of the connecting portion 136, corresponding to the gap 60 of the rear panel 50. A lug 140 is formed on an end of the connecting portion 136 opposite to the base 132, for sliding within the L-shaped nick 56 of the rear panel 50. The bottom and the top of the connecting portion 136 are symmetrical.

Figure 7:
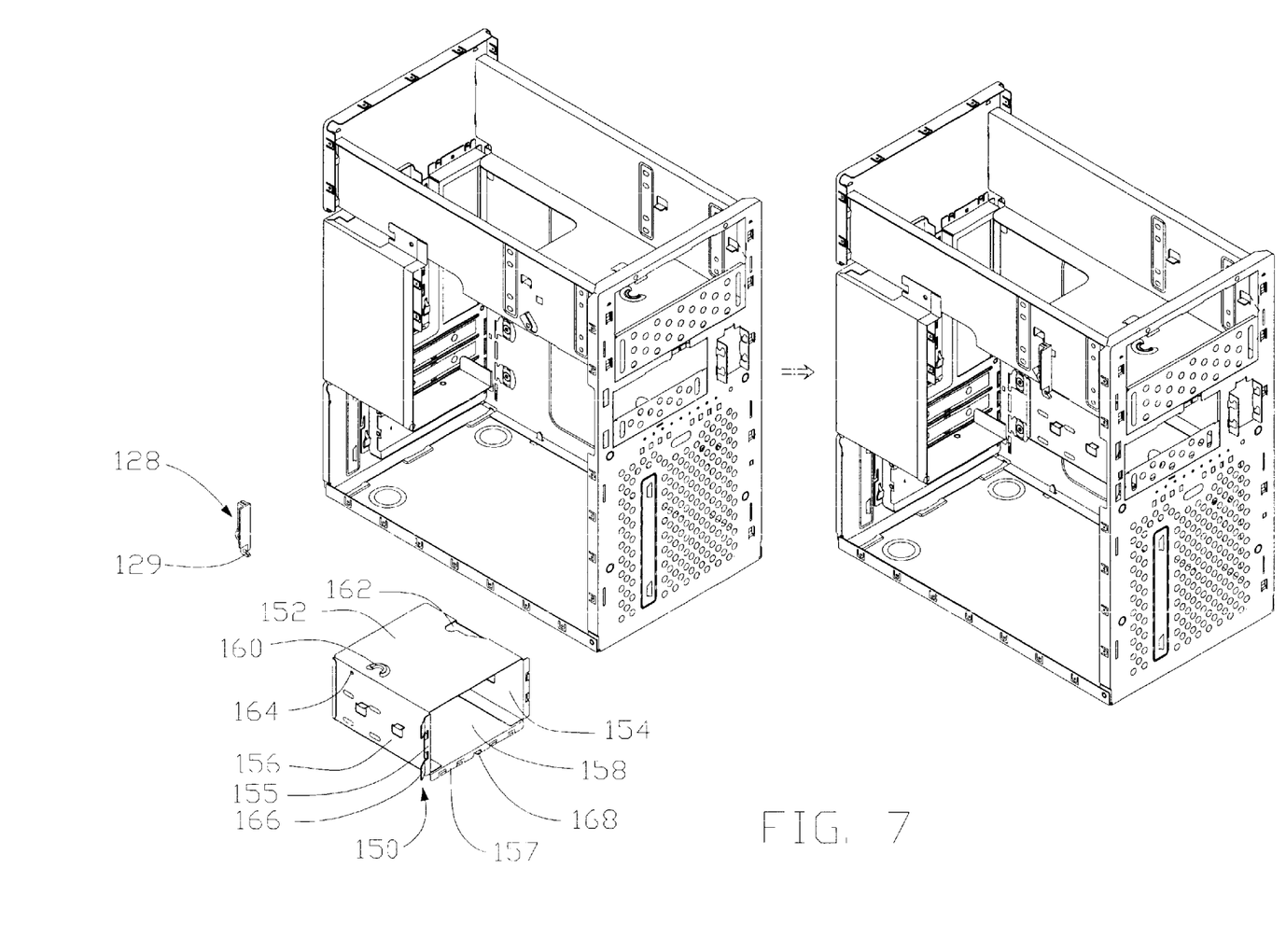

Referring also to FIG. 7, the second drive bracket 150 is box-shaped and comprises a top wall 152, a pair of second side walls 156, 154 depending from the top wall 62, a second bottom wall 158, and a rear wall (not labeled). A second retaining portion 160 is formed on the top wall 152 near the second side wall 156. The second retaining portion 160 is similar in shape to the first retaining portion 124 of the first drive bracket 110. A second retaining cutout 162 is defined through both the second side wall 154 and the top wall 62. The second retaining cutout 162 is similar in shape to the first retaining cutout 122. A post 164 is formed at a rear portion of the second side wall 156, near the top wall 152. A first rim 155 extends perpendicularly from a free edge of the second side wall 156. A pair of bent ears 166 further extends outwardly from a vertical distal edge of the first rim 155, for engaging with the slits 36 of the front panel 24. A second rim 157 depends from a free edge of the second bottom wall 158. A front tab 168 is formed in the second rim 157, for engaging with the aperture 38 of the front panel 24.

Figure 8:
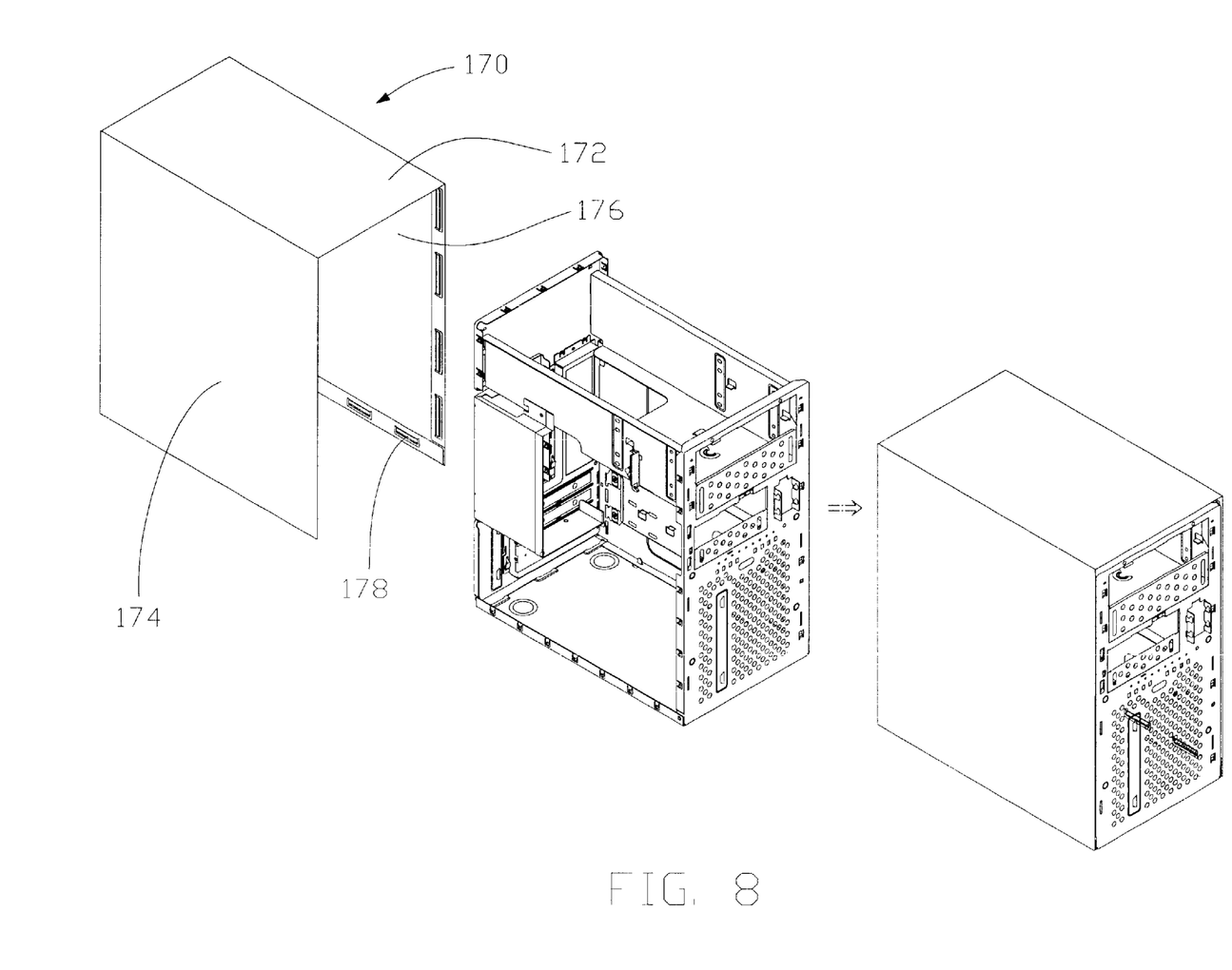

Referring also to FIG. 8, the cover 170 of the present invention has an inverted U-shape. The cover 170 comprises a top panel 172, a pair of side panels 174, 176. A plurality of internal clamps 178 is formed at front, bottom and rear edges of the side panels 174, 176, for interferentially engaging with the front panel 24, the bottom panel 22 and the rear panel 50.

Referring to FIGS. 2–8, in assembly, the rear window frame 72 is placed on the rear panel 50 to cover the L-shaped second opening 62. The second hooks 64 of the rear panel 50 are inserted into the locating holes 74 of the rear window frame 72. Referring particularly to FIG. 3, the protrusions 70 of the rear panel 50 are then engaged with the embedding holes 26 of the bottom panel 22. The rear panel 50 is thereby secured to the bottom panel 22 of the chassis 20. Referring particularly to FIG. 4, the loading board 80 is laid down between the rear panel 50 and the front panel 24 of the chassis 20. The second latches 40 of the front panel 24 are inserted into the orifices 92 of the loading board 80, and then the locating tab 28 of the bottom panel 22 is inserted into the split 90 of the loading board 80. The loading board 80 is thereby secured between the front and rear panels 24, 50.

Referring particularly to FIG. 5, the first drive bracket 110 is placed between the front and rear panels 24, 50, and over the loading board 80. The grooves 120 of the first drive bracket 10 are respectively latched with the first hooks 51 of the rear panel 50 and the first latches 34 of the front panel 24. The locating nubs 88 abut an outer side of the first side wall 116. Referring particularly to FIG. 6, the power supply bracket 130 is secured to the rear panel 50 at the first opening 52 of the rear panel 50. The lug 140 of the power supply bracket 130 is inserted into the L-shaped nick 56 of the rear panel 50. The power supply bracket 130 is pressed inwardly, causing the lug 140 to slide within the nick 56 and the boss 138 to enter the gap 60 of the rear panel 50.

Referring particularly to FIG. 7, the second drive bracket 150 is secured to the front panel 24. The bent ears 166 of the second drive bracket 150 are inserted into the slits 36 of the front panel 24. The second drive bracket 150 is then rotated, until the second rim 157 abuts the front panel 24 and the front tab 168 is received in the aperture 38 of the front panel 24. The second retaining portion 160 engages with the first retaining cutout 122, and the second retaining cutout 162 engages with the first retaining portion 124. A fastener 128 is attached to the pivot portion 126. A catch 129 of the fastener 128 is engaged with the post 164 of the second drive bracket 150, to secure the second drive bracket 150 to the first drive bracket 110. Referring to FIG. 8, the cover 170 is placed over the subassembly of FIG. 7, and the cover 170 is pushed downwardly. The clamps 178 of the cover 170 interferentially engage with the flanges 66 of the rear panel 50, and with the strips 42 of the front panel 24 and the bottom panel 22. The top panel 172 covers the top of the subassembly of FIG. 7, and the side panels 174, 176 cover sides of the subassembly of FIG. 7. The enclosure is thereby fully assembled together. The cover 170, the rear panel 50 and the chassis 20 cooperatively surround the loading board 80, the power supply bracket 80 and the first and second drive brackets 110, 150.

The most important advantage of the enclosure of the present invention is that it is conveniently assembled together.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a chassis comprising a bottom panel and a front panel extending vertically from the bottom panel, the front panel defining at least one first latch and a plurality of second latches;
   a rear panel secured to the bottom panel of the chassis opposite the front panel, the rear panel defining a first opening at a side thereof and comprising a pair of symmetrical sills respectively formed adjacent top and bottom extremities of the cutout, and at least one hook at a side of a top portion thereof, each sill defining a nick and a gap therein;

a loading board comprising at least one flap, the flap defining a plurality of orifices receiving the second latches of the front panel, thereby securing the loading board to the chassis;

a first drive bracket comprising a first bottom wall and at least one first side wall, a pair of wings extending from opposite ends of each first side wall, each wing defining at least one groove therein, each groove of one wing engaging with one corresponding first latch of the front panel, each groove of another wing engaging with one corresponding hook of the rear panel;

a power supply bracket comprising a shield and a pair of connecting portions respectively extending from top and bottom sides of the shield, each connecting portion comprising a lug received in and sliding within the corresponding nick and a boss received in the corresponding gap, the power supply bracket thereby being received in the first opening of the rear panel;

a second drive bracket secured to the front panel and the first drive bracket; and a cover comprising a top panel and a pair of side panels; wherein the cover, the rear panel and the chassis cooperatively surrounding the loading board, the power supply bracket and the first and second drive brackets.

2. The computer enclosure as recited in claim 1, wherein the bottom panel of the chassis defines a plurality of embedding holes opposite the front panel, and wherein a plurality of protrusions is formed at a bottom of the rear panel, the protrusions being inserted into the embedding holes for securing the rear panel to the chassis.

3. The computer enclosure as recited in claim 1, wherein the bottom panel of the chassis defines a locating tab at a side thereof between the embedding holes and the front wall, and wherein the locating board further comprises a flap, the flap defining a split for insertion of the locating tab of the chassis therein.

4. The computer enclosure as recited in claim 1, wherein the second drive bracket comprises a second bottom wall, a top wall, and a pair of second side walls depending from the top wall.

5. The computer enclosure as recited in claim 4, wherein the front panel of the chassis defines at least one slit, and wherein one second side wall of the second drive bracket forms at least one bent ear for engaging with the slit.

6. The computer enclosure as recited in claim 4, wherein the second bottom wall of the second drive bracket forms a front tab at a rim thereof, and wherein the front panel of the chassis defines an aperture for insertion of the front tab therein.

7. The computer enclosure as recited in claim 4, wherein the first drive bracket forms a pivot portion at a first side wall for engaging with a fastener, and wherein the second drive bracket forms a post at one second side wall thereof for engaging with a catch of the fastener, thereby securing the second drive bracket to the first drive bracket.

8. The computer enclosure as recited in claim 4, wherein a first retaining portion is formed on the first bottom wall of the first drive bracket, a first retaining cutout is defined through both the first bottom wall and one first side wall of the first drive bracket, a second retaining cutout is defined through both the top wall and one second side wall of the second drive bracket for engaging with the first retaining portion of the first drive bracket, and a second retaining portion is formed on the top wall of the second drive bracket for engaging with the first retaining cutout.

9. The computer enclosure as recited in claim 8, wherein the second retaining portion of the second drive bracket is similar to the first retaining portion of the first drive bracket.

10. The computer enclosure as recited in claim 8, wherein the second retaining cutout of the second drive bracket is similar to the first retaining cutout of the first drive bracket.

11. The computer enclosure as recited in claim 1, wherein the rear panel defines an L-shaped second opening therein, and an L-shaped rear window frame is attached to the second opening for receiving expansion cards therein.

* * * * *